United States Patent [19]

Brannon

[11] Patent Number: 4,830,244

[45] Date of Patent: May 16, 1989

[54] FISH STRINGER WITH HOLDER

[76] Inventor: Cecil R. Brannon, Ste. 250, 2069 Zumbehl Rd., St. Charles, Mo. 63303

[21] Appl. No.: 27,339

[22] Filed: Mar. 18, 1987

[51] Int. Cl.⁴ .............................................. A01K 65/00
[52] U.S. Cl. .................................. 224/103; 224/253; 224/269
[58] Field of Search ............... 224/252, 253, 103, 920, 224/271, 269, 251

[56] References Cited

U.S. PATENT DOCUMENTS

| 2,743,894 | 5/1956 | Ostnas | 224/271 X |
| 2,800,263 | 7/1957 | Hunt | 224/103 |
| 2,966,356 | 12/1960 | Wilson et al. | 224/271 X |
| 3,052,002 | 9/1962 | Lesher | 224/103 X |
| 3,160,336 | 12/1964 | Flatford et al. | 224/103 |
| 3,191,827 | 6/1965 | Tofte, Jr. | 224/103 |
| 3,550,823 | 12/1970 | Tofte, Jr. | 224/103 |
| 4,190,955 | 3/1980 | Rushforth | 224/252 X |
| 4,570,836 | 2/1986 | Mayo | 224/253 X |

Primary Examiner—Henry J. Recla
Attorney, Agent, or Firm—Haverstock, Garrett & Roberts

[57] ABSTRACT

A fish stringer is detachably connected to a belt clip and intended to be suspended from the waist in shallow water for example. The belt clip has a socket including one or more detent(s) therein for retaining the shank of the stringer. The upper end of the stringer shank has an upset portion thereon in order to retain the shank within the socket. A clamp removably unites the shank to a length of string on one end of which is a hoop member. The shank of the stringer is adapted to be removed from the belt clip and to be replaced thereon by the use of one hand of the wearer.

9 Claims, 1 Drawing Sheet

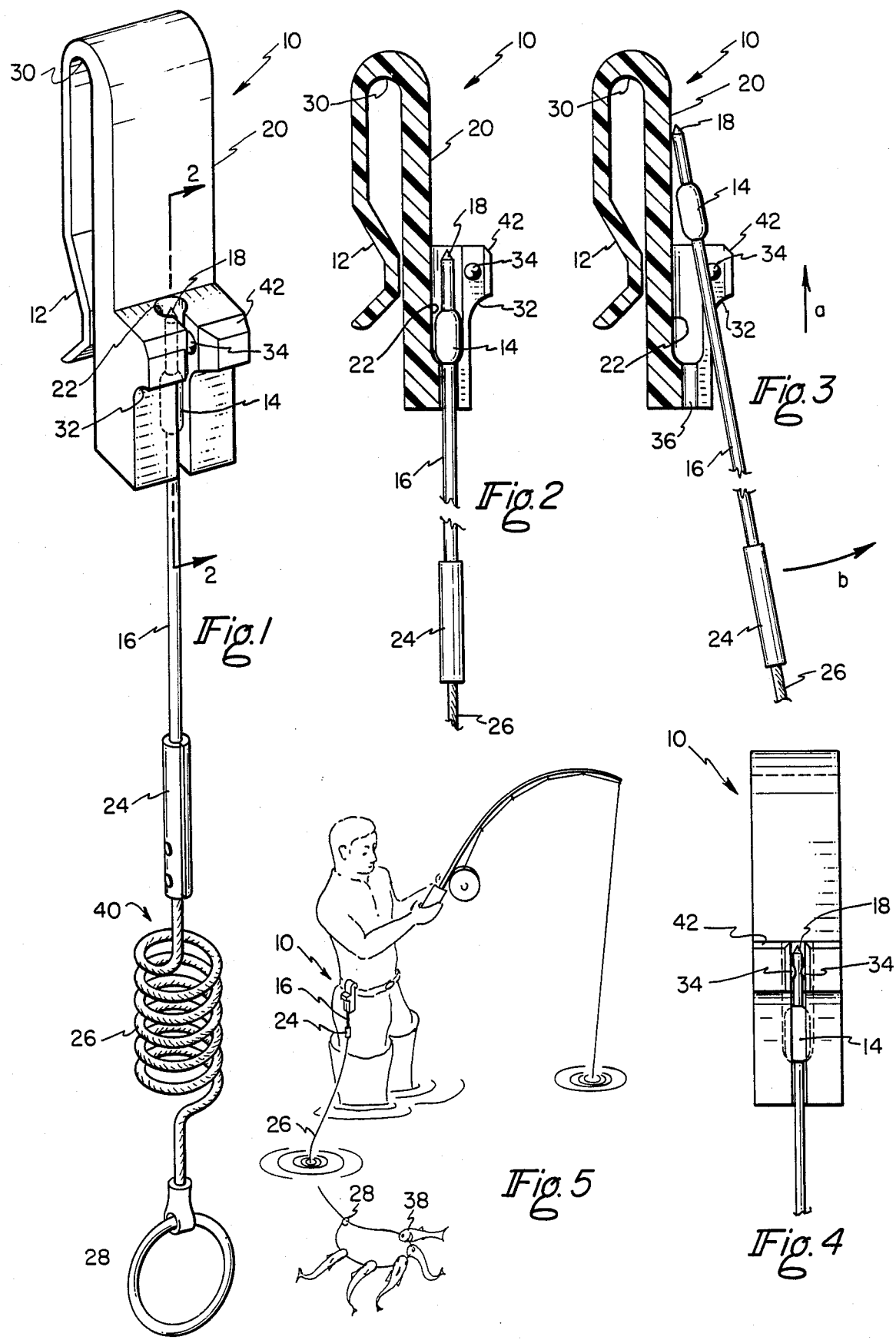

FISH STRINGER WITH HOLDER

BACKGROUND

This invention relates to fishing equipment and more particularly to a fish stringer for the securing of freshly caught fish while in the field.

Fish stringers are one of the most popular ways used by fisherman to store freshly caught fish while in the field. One type consists of a length of small diameter cord to which a small hoop is attached at one end and a pointed shank is attached to the other. The shank is threaded through the first caught fish and then passed through the hoop thereby securing it. The shank end is tied to the boat, belt loop, dock or any place close enough to suspend the fish in the water. As each subsequent fish is caught, the string is untied and the fish is threaded through the shank, and the knot is tied again and the fish lowered into the water. This type of stringer requires two hands to operate and entails quite a bit of tying and untying of knots. Another type of stringer consists of a length of chain with metal clips attached thereto. This device eliminates the continual need to tie and untie knots but requires all fish to be lifted out of the water as each new fish is attached and also requires the use of two hands. It is inconvenient to lay fish down while tying and untying knots and pulling a clip stringer out of the water to gain access to clips. This device is also inherently noisy, especially if used alongside a metal boat.

As noted above, fish stringers are old in the art as exemplified for example by U.S. Pat. Nos. 2,453,381; 2,518,541; 2,563,480; and 4,308,643. A releasably held fish stringer can be seen in U.S. Pat. No. 2,950,888; while U.S. Pat. No. 3,550,823, shows a fish stringer attached to the belt of a fisherman. However, none of the above prior art references anticipate the specific device of the present invention nor render the details thereof obvious, as will be apparent hereinafter. The device of the present invention is intended to overcome some of the problems of the previous devices noted above and to provide a stringer device that is more effective and easier for fisherman to use.

SUMMARY

This invention relates to a one-piece holder and clip with dentention element(s) and a slot and socket for storage of a special modified shank. This modification consists of an oblong upset located towards the point of the shank. To secure the shank it is placed above the socket with the upset slightly forward of said socket. With the thumb exerting a slight pressure on the shank, the shank is forced past the detention elements and down into the socket. Any tension placed on the fishing string will draw the upset into the socket. To remove the shank, the procedure is reversed and the fish is strung in the ordinary manner. The shank is then returned to the holder and enables the clip and the holder to be attached to a belt, belt loop, the side of a boat or a rope without the necessity of tying or untying knots. This also enables the clip and the holder to be relocated easily.

The clip and the holder have been designed to be injection molded as one piece with no assembly or moving parts required. This greatly lowers tooling and production costs. This also eliminates failures caused by corrosion or debris fouling. The one-handed operation of the device will make the stringing of fish a more convenient operation. In addition, while in the secured position, the point of the shank is not exposed which protects the fisherman. The modified shank and upset is one piece and designed for simple construction and fool proof operation.

This invention further relates to a fish stringer for securing freshly caught fish comprising a holder member having a clip on its backface for releasably attaching the holder to a support, said holder including an elongated socket therein and receiving one end of a shank member, said shank having thereon an enlarged upset portion for lodging in said shank, at least one or more detent member(s) within said socket for maintaining said shank but expandable with the socket in order to allow said shank to be removed from the socket, the upper end of said shank having a pointed tip and the lower end thereof including a length of line having a ring member on the end thereof.

The invention also relates to a fish stringer for maintaining fish in a fresh condition after being caught comprising a holder having a clip member on one side thereof and a raised thickened portion on the other side, an elongated open channel in the thickened portion of the holder, a shank member having an enlargement adjacent one end and a clamp on the other end, said elongated open channel having a shape conforming substantially to the shape of the shank enlargement, detent means in the channel for retaining the shank therein and a length of line connected at one end to the clamp and having a ring at its other end.

The invention still further relates to a fish stringer comprising an elongated shank member detachably connected to a belt clip and intended to be suspended from the waist of a fisherman in shallow water, the belt clip being adapted to be worn on the belt of the fisherman and including therein a socket having one or more detent(s) therein in order to retain the shank of the stringer therein, the upper end of the stringer shank including an enlarged upset portion thereon in order to retain the shank within the socket, a clamp united to the shank and including a length of line having a loop member on the end thereof, the stringer shank being adapted to be removed and replaced in the belt clip manually by the fisherman with the use of one hand.

In addition, the invention covers a fish stringer and the like comprising an elongated rod-like member having a pointed surface on one end thereof and a collar connector on the other end thereof, an enlarged portion on the rod adjacent said pointed end, a holder for said rod and the holder being attachable to a belt and the like of the wearer, the holder including an elongated open channel therein and with the rod-like member being carried and supported in the said channel with the enlarged portion of the rod being nested within the channel, one or more detent member(s) arranged within the open front face of the channel in order to prevent the rod-like member from being removed therefrom without the application of a substantial pulling force thereon, and a length of line having a ring at one end and attached to said collar at its other end.

Other advantages of this invention will be apparent from the description which follows in conjunction with the accompanying drawings and claims.

DRAWINGS

FIG. 1 is a pictorial representation of the fish stringer of the present invention including the belt clip to which the stringer is detachably carried.

FIGS. 2 and 3 are each taken along line 2—2 of FIG. 1 and are pictorial representations partly in cross-section of the upper portion of the fish stringer of FIG. 1. FIG. 3 in addition illustrates the orientation of the stringer for the purpose of removal from the belt clip.

FIG. 4 is a view similar to FIGS. 2 and 3 except that the front face of the belt clip is shown.

FIG. 5 is another pictorial representation of the fish stringer of the present invention but in actual use by a fisherman in shallow water for example.

DESCRIPTION

Referring to the drawings in detail, an upset 14 is placed below the shank point 18. The upset 14 is configured to seat into the socket 22 located in and atop the clip and holder 20. FIG. 5 shows the clip and holder and the stringer 10 in use. FIG. 3 shows the method for insertion and removal of shank 16.

To insert shank 16, the upset 14 is placed forward and above socket 22 with the shank point 18 resting on holder flat surface 20. Pressure is exerted on the portion of the shank 16 above the thumb relief 32. This action forces shank 16 past the detention points 34 and into socket 22 as well as shank housing 36. Since the shoulder of upset 14 forms an inclined plane, all of the tension is placed on the shank caused by the weight of the fish 38 that are attached to the string 26; and hoop 28 and clamp 24 will cause upset 14 to seat in socket 22. This shields the shank point 18 and prevents any downward or side-axial motion of shank 16 from dislodging same. The clamp 24 prevents dislodgment if forward pressure is applied.

To remove the shank and string assembly 40 from holder 20, the shank 16 is moved forward as shown in FIG. 3 in relation to holder 20 until upset 14 clears socket 22. With the thumb resting on pressure ledge 42, shank 16 is raised past detention points 34 and the shank and string assembly 40 is ready to string freshly caught fish in the usual manner.

The clip and holder 20 is secured by passing clip 12 over the edge of a boat, a length of rope, belt, belt loop, dock, anchor, or any other sturdy object no larger than clip radius 30. Removing or replacing the holder 20 can be accomplished with one hand.

Line 26 may comprise string, rope, filament, or wire where desired. The upset or enlarged portion 14 of the shank 16 may be of other configurations than the oval-type shape shown, such as round, for example. Leaf 12 of clip 20 should be flexible enough to pass over the various objects to which it is intended to be attached.

The enlarged protruding shank housing portion 36 of holder 20 should be sized so that ledge 42 and thumb hold 32 are of a magnitude sufficient to be grasped with one hand and easily manipulated in order to remove and to re-insert the rod-like member 16. The rod 16 is removed as seen in FIG. 3 by an outward pull (arrow b) and a simultaneous upward movement (arrow a). Such action snaps the rod 16 past detents 34 and allows the rod 16 to free itself from the holder 20. The rod 16 is replaced in the reverse order. When seated within holder 20, portion 14 of shank 16 is nested in channel 22 in an otherwise close-fitting relationship. Since point 18 is below ledge 42 as shown in FIG. 4, there is no danger of the fisherman being injured by the pointed object. If desired, loop 28 may include a swivel in order to attach it to the line 26. Line 26 is shown in the shape of a coil for illustrative purpose only in FIG. 1, for example. Clip 12 may also have other configurations other than that seen in FIGS. 1-3, the only requirement being that it be resilient enough to pass over the item to which it is to be attached and possesses enough bias to maintain the holder and rod in place where attached.

In operation of the device, after the first fish is caught and captured, the stringer 10 is removed from the holder 20 by pulling on the shank 16 in the fashion depicted in FIG. 3 while at the same time lifting it upwards to clear upset 14 from the socket 22. Arrows A and B in FIG. 3 show generally the line of movement which also causes shank 16 to clear detents 34. With shank 16 free of holder 20, the pointed end 18 of the shank 16 is poked through the thin membrane behind the tougher cartilage of the lip or bone of the jaw of the first fish in order to string the fish. Loop 28 is passed over point 18 and down along shank 16 to line 26 which forms the stringer into a closed loop a shown in FIG. 5. Shank 16 is then re-inserted into holder 20 until the next catch. The above procedure is repeated with the next and successive fish with the exception of passing point 18 through loop 28. Otherwise the procedure is repetitive as noted above, until line 26 is full as partially illustrated in FIG. 5.

It will be apparent from the foregoing that many other variations and modifications may be made in the structures and methods described herein without departing substantially from the essential concept of the present invention. Acordingly, it should be clearly understood that the forms of the invention described herein and depicted in the accompanying drawings are exemplary only and are not intended as limitations in the scope of the present invention.

What is claimed is:

1. A fish stringer for securing freshly caught fish comprising a holder member having a body portion with front and rear faces and a clip portion for releasably attaching the holder member to a support member, said holder member having an elongated open sided passage therethrough one end of which is enlarged to form an open ended socket therein, an elongated shank member having a free end and an opposite end, a length of stringer cord attached to the opposite end of the shank member, said shank member having a size to freely extend through the elongated passage in the holder member and to enter through the open side thereof, an enlarged upset mounted on the shank member at an intermediate location, said upset having a cross-section that enables it to move into the socket portion of the elongated passage but not through the elongated passage, a detent formed in the holder member adjacent to the open side of the passage to restrict lateral passage of the shank member into and out of the passage, said detent being yieldable under pressure on the shank member to enable the shank member to move laterally into or out of the elongated passage.

2. The stringer of claim 1 wherein said holder member has a ledge formed thereon adjacent to one end of the socket and a thumb relief portion on the opposite side of the ledge, the clip portion extending endwardly from the holder member adjacent said one end side of the socket forming a support surface against which the free end of the shank member can be pressed when prying the shank members loose from the opening.

3. The stringer of claim 1 wherein the upset portion on the shank is substantially oval in cross-section.

4. The stringer of claim 1 wherein the open sided elongated passage has spaced opposed detents formed adjacent to the open side thereof.

5. The stringer of claim 1 wherein the shank member has an enlarged portion attached thereto at spaced location from the upset portion, said enlarged portion having a cross sectional size greater than the cross sectional size of the elongated passage.

6. The stringer of claim 1 wherein the clip portion of the holder member is formed of a flexible material shaped to define an opening large enough to receive a belt or like support device.

7. A fish stringer including a holder member having spaced opposite side surfaces and spaced opposite ends, a clip portion connected to one of said ends for suspending the holder member from a support structure such as a belt or the like, a portion of the holder member extending outwardly from the opposite side of the holder member from the clip portion, an elongated passage having a side opening thereinto extending through said outwardly extending portion, an end surface on the portion of the holder member adjacent one end of the passage, the side opening into the passage having detent means thereon, an elongated shank having a diameter large enough to pass through the opening into the passage when sufficient lateral force is applied thereto against the detent means, said shank member having a free end and an opposite end, enlargement means on the shank member at an intermediate location therealong engageable with the holder member adjacent one end of the passage to prevent longitudinal movement of the shank member through the passage in one direction and a stringing cord attached to the opposite end of the shank member.

8. The stringer of claim 7 including other enlargement means on the shank portion at a location spaced from the aforesaid enlargement means by at least the length of the passage through the holder member to prevent longitudinal movement of the shank portion through the passage in the opposite direction.

9. The stringer of claim 7 wherein the elongated passage has an enlarged portion adjacent to one end thereof forming a socket into which the enlargement means on the shank member can be positioned.

* * * * *